(12) United States Patent
Dally et al.

(10) Patent No.: US 7,187,721 B1
(45) Date of Patent: Mar. 6, 2007

(54) TRANSITION-TIME CONTROL IN A HIGH-SPEED DATA TRANSMITTER

(75) Inventors: William J. Dally, Stanford, CA (US); John W. Poulton, Chapel Hill, NC (US)

(73) Assignee: Rambus Inc., Los Altos, CA (US)

( * ) Notice: Subject to any disclaimer, the term of this patent is extended or adjusted under 35 U.S.C. 154(b) by 0 days.

(21) Appl. No.: 09/557,164

(22) Filed: Apr. 25, 2000

Related U.S. Application Data (60) Provisional application No. 60/181,276, filed on Feb. 9, 2000.

(51) Int. Cl.
*H04L 27/04* (2006.01)

(52) U.S. Cl. ...................................... 375/295

(58) Field of Classification Search ................ 375/295, 375/215, 294, 376, 354, 355, 360, 372, 373, 375/374, 375, 35; 326/93; 327/276, 277, 327/278, 281, 288, 261, 263, 264, 219, 161; 370/503; 329/307, 325, 360; 713/401
See application file for complete search history.

(56) References Cited

U.S. PATENT DOCUMENTS

| | | | | |
|---|---|---|---|---|
| 4,694,200 A | * | 9/1987 | Hetyei ........................... | 327/72 |
| 5,097,489 A | * | 3/1992 | Tucci ........................... | 375/374 |
| 5,313,501 A | * | 5/1994 | Thacker ....................... | 375/369 |
| 5,347,233 A | * | 9/1994 | Ishibashi et al. ................ | 331/2 |
| 5,525,935 A | * | 6/1996 | Joo et al. ....................... | 331/11 |
| 5,845,109 A | * | 12/1998 | Suzuki et al. ............... | 713/401 |
| 6,028,903 A | * | 2/2000 | Drost et al. .................. | 375/360 |
| 6,043,694 A | * | 3/2000 | Dortu .......................... | 327/156 |
| 6,075,395 A | * | 6/2000 | Saeki .......................... | 327/161 |
| 6,114,890 A | * | 9/2000 | Okajima et al. ............. | 327/170 |
| 6,118,313 A | * | 9/2000 | Yakabe et al. .............. | 327/116 |
| 6,140,835 A | * | 10/2000 | Shirai .......................... | 326/24 |
| 6,157,229 A | * | 12/2000 | Yoshikawa .................. | 327/149 |
| 6,239,627 B1 | * | 5/2001 | Brown et al. ............... | 327/116 |
| RE37,232 E | * | 6/2001 | Saeki .......................... | 327/261 |
| 6,242,960 B1 | * | 6/2001 | Bae ............................. | 327/299 |
| 6,246,271 B1 | * | 6/2001 | Takada et al. .............. | 327/116 |
| 6,259,755 B1 | * | 7/2001 | O'Sullivan et al. ......... | 375/376 |

(Continued)

OTHER PUBLICATIONS

Dally, William J. and Poulton, John W., *Digital Systems Engineering*, Cambridge University Press, 1998, pp. 533-536.

(Continued)

*Primary Examiner*—Emmanuel Bayard
(74) *Attorney, Agent, or Firm*—Hamilton, Brook, Smith & Reynolds, P.C.

(57) ABSTRACT

Transition time of a data signal is controlled by applying different delays to the data signal and combining the delayed data signals. The transition time of the data output is determined by difference in delays applied to the data input and may be proportional to bit time of the bit clock. The data input may be applied directly to the delay elements or may be clocked by clock signals delayed by the delay elements. The delayed data is applied to parallel driver circuits. Supply voltage to the delay elements can be controlled to compensate for production and environmental variations. The supply voltage controller includes parallel delay elements of different delays and a phase comparator, the output of which controls the supply voltage applied to the delay elements.

55 Claims, 7 Drawing Sheets

U.S. PATENT DOCUMENTS

| | | | |
|---|---|---|---|
| 6,275,068 B1 * | 8/2001 | Kermani et al. | 326/93 |
| 6,275,547 B1 * | 8/2001 | Saeki | 375/354 |
| 6,285,722 B1 * | 9/2001 | Banwell et al. | 375/354 |
| 6,330,289 B1 * | 12/2001 | Keashly et al. | 375/297 |
| 6,337,590 B1 * | 1/2002 | Millar | 327/158 |
| 6,507,915 B1 * | 1/2003 | Franca-Neto | 713/401 |
| 6,650,692 B2 * | 11/2003 | Inoue et al. | 375/147 |
| 6,657,936 B2 * | 12/2003 | Harvey et al. | 369/59.12 |
| 6,885,670 B1 * | 4/2005 | Regula | 370/401 |

OTHER PUBLICATIONS

Garcia, F. et al., "Design of a Slew Rate Controlled Output Buffer," IEEE 0-7803-4980, 1998, pp. 147-150.

Raver, Norman, "Open-Loop Gain Limitations for Push-Pull Off-chip Drivers," IEEE Journal of Solid-State Circuits, vol. SC-22, No. 2, Apr. 1987, pp. 145-150.

Hashimoto, Masashi et al., "Low dI/dt Noise and Reflection Free CMOS Signal Driver," IEEE 1989 Custom Integrated Circuits Conference, 1989, pp. 14.1.1-14.4.4.

Tomioka, Ichiro, et al., "Current Control Buffer for Multi Switching CMOS SOG," IEEE 1990 Custom Integrated Circuits Conference, 1990, pp. 11.7.1-11.7.4.

Hanafi, Hussein I., et al., "Design and Characterization of a CMOS Off-Chip Driver/Receiver with Reduced Power-Supply Disturbance," IEEE Journal of Solid-State Circuits, vol. 27, No. 5, May 1992, pp. 783-791.

Maloberti, Franco et al., "On the Design of CMOS Digital Output Drivers With Controlled dI/dt," IEEE, CH 3006-4/91/000-2236, 1991, pp. 2236-2239.

Senthinathan, R., et al., "Application Specific CMOS Output Driver circuit Design Techniques to Reduce Simultaneous Switching Noise," IEEE Journal of Solid-State Circuits, vol. 28, No. 12, 1993, pp. 1383-1388.

Furutani, K., et al., "An Adjustable Output Driver with a Self-Recovering Vpp Generator for a 4M×16 DRAM," IEEE Journal of Solid-State circuits, vol. 29, No. 3, 1994, pp. 308-310.

Choy, Dr. C.S., et al., "A feedback control circuit design technique to suppress power noise in high speed output driver," IEEE, 0-7803-2570-2/95, 1995, pp. 307-310.

Leung, Kam, "Controlled Slew Rate output Buffer," IEEE 1988 Custom Integrated Circuits Conference, 1988, pp. 5.5.1-5.5.4.

* cited by examiner

TRANSITION-TIME CONTROL IN A HIGH-SPEED DATA TRANSMITTER

RELATED APPLICATION(S)

This application claims the benefit of U.S. Provisional Application No. 60/181,276, filed Feb. 9, 2000, the entire teachings of which are incorporated herein be reference.

BACKGROUND OF THE INVENTION

The transition time, rise time or fall time, of an output driver is the time required for the output signal to slew between two voltages, typically 20% and 80% of full swing. In certain prior-art systems, for example, transition time must be maintained larger than a specified minimum value to keep the derivative of the supply current, and hence the inductive switching noise (sometimes called simultaneous switching output (SSO) noise), within limits. At the same time, transition time must be kept smaller than a maximum value to avoid excessive delay of the signal.

Across variations in process parameters, supply voltage, and temperature, transition time can vary by a considerable amount, often by a factor of two or more. In some applications, the spread between maximum and minimum values for transition time is wide enough so that this variation is acceptable. In other applications, however, the window of legal transition times is small and such a large variation in transition time is unacceptable.

Transition time control has been employed in prior art systems with relatively slow signaling rates, where the bit time is greater than 10 gate delays. At such data rates, transition time can be controlled by using a tapped delay line to sequence the stages of a segmented transmitter or by slowing the predriver stage of a transmitter. These techniques are discussed in Dally and Poulton, *Digital Systems Engineering*, Cambridge, pages 533–536.

Still other prior art systems have employed transition time control by controlling the transition time of a pre-driver which, in turn, controls the transition time of the output driver. The pre-driver transition time may be controlled by varying its supply voltage, controlling its supply current, or enabling a variable number of parallel pre-driver elements. As explained in Dally and Poulton, pp 533–536, slowing the transition time of the pre-driver in this manner can lead to severe inter-symbol interference, especially at high signaling rates. Because the output stage typically has significant gain, the predriver must be made very slow to give an output transition time that is a substantial fraction of a bit time. Often the pre-driver is so slow that it is not able to swing full-rail before the end of the bit time leading to significant inter-symbol interference due to the retained state.

In systems that operate at fast signaling rates, where the bit time is just a few loaded gate delays (less than 10), neither of these prior art transition control mechanisms is applicable. The transition time in such high-speed systems is just a few gate delays (less than 3) and thus comparable to the delay of a single tap of a tapped delay line. Because the entire transition must occur in just one (or at most two) taps of the delay line, it is not possible to smoothly sequence the transition by using a tapped delay line to sequence transmitter segments.

In such high-speed systems, the transition time is typically a large fraction of the bit time (usually 30%–50%). This is because a faster transition time would stress the bandwidth of the transmission medium (package, PC board, and connectors) without offering any substantial advantage. With such a ratio of transition time to bit time, it is not possible to control the transition time by slowing the pre-driver. To do so would require the predriver to have a delay much longer than the bit time and thus would cause intersymbol interference.

Because of these limitations, prior-art high-speed signaling systems have not employed transition time control and, as a result, have incurred large variations in transition time across process, voltage, and temperature corners.

SUMMARY OF THE INVENTION

In accordance with one aspect of the invention, a data transmitter comprises a data input and plural delay elements. The delay elements apply different delays to the data input in parallel to provide plural delayed data signals. A data output combines the delay and data signals so that a transition time of the data output is determined by difference in delays applied to the data input.

Prior art transition control systems controlled the transition time to be a fixed value, regardless of the bit time of the system. With a fixed transition time, a signaling system operating at a lower speed is forced to use a transition time optimized for the highest possible speed of operation, unduly stressing the bandwidth of the transmission medium.

In accordance with another aspect of the invention, transition time control controls the transition time of a controlled data signal to be proportional to bit time of a bit clock.

A clock signal may be applied to the delay elements, with different delays being applied to the data input by clocking the data input with different delayed clock signals. Alternatively, the data input may be applied in parallel directly to the delay element. In either case, the delayed data signals are applied to plural driver circuits. Preferably, each delay element comprises CMOS inverters and the delay of the delay elements is determined by load capacitance.

Supply voltage to the delay elements may be controlled to control delay of the delay elements. In one embodiment, a circuit to control the supply voltage to the delay elements comprises first and second delay elements, each receiving a common clock signal. A phase comparator compares outputs of the first and second delay elements and controls a supply voltage applied to the first and second delay elements to control phase difference of the outputs. Each of the first and second delay elements may comprise a sequence of n elements and the clock signal frequency may then be 1/n times bit rate. The supply voltage may thus be varied to compensate for environmental changes in delay.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

A description of preferred embodiments of the invention follows.

In a high-speed transmission system, where the bit time is less than 4 gate delays, prior art approaches to controlling rise time do not apply. A tapped delay line cannot be used since the desired transition time is comparable to the delay of a single tap. Slowing the predriver is also not appropriate as it will result in considerable ISI as the slow predriver stage will not reach a steady state before the end of each bit cycle.

The present invention overcomes these limitations and controls the rise time of a high-speed transmitter by segmenting the transmitter and driving each segment with a variable delay element driven from a common clock node. By appropriately adjusting the delays of the variable delay elements the segment switching times can be set at intervals that are a small fraction of a gate delay resulting in a controlled transition time comparable to a single gate delay. With this approach the timing resolution is set by the difference between element delays rather than by the delay of a single element. This gives a granularity of timing control fine enough to handle the fastest signaling systems.

In high-speed signaling systems it is advantageous to control the transition time to be not a fixed interval, but rather a fraction of the bit-time (e.g., 40%). With this approach, a signaling system operating at a lower speed (with a longer bit time) would use a proportionally longer transition time. Hence it requires less bandwidth out of the transmission medium and can use less expensive materials and components in constructing the transmission system. At very low signaling rates, of course, the transition time is maintained less than a fixed maximum to avoid noise problems that occur with very slow transition times.

The present invention achieves this variable bandwidth advantage by controlling transition time to be a fraction of the bit time. This is accomplished by adjusting the variable delay elements so the difference in delay between the slowest element and fastest element is equal to the desired fraction of a clock cycle.

Figure 1:
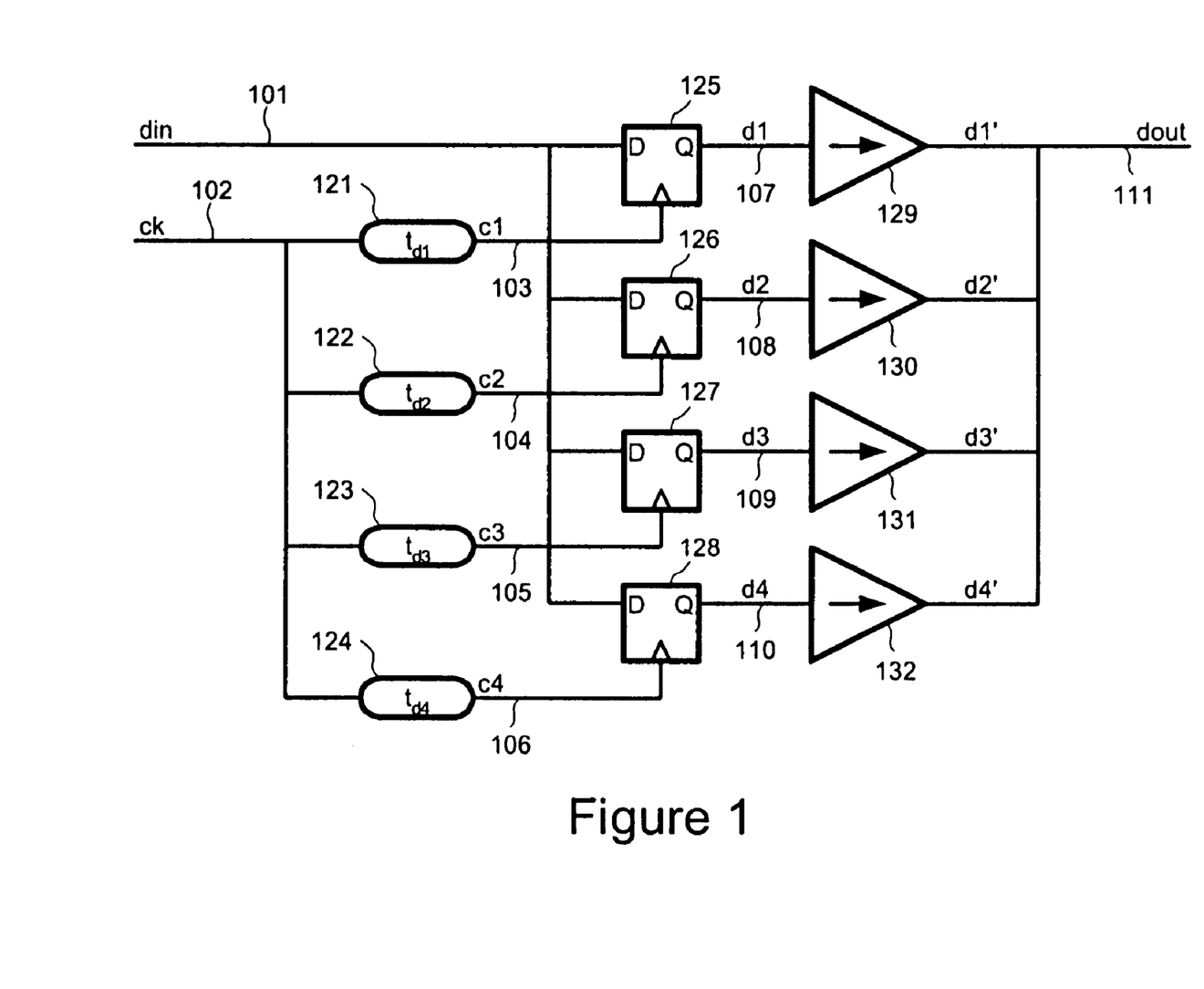
FIG. 1 illustrates an embodiment of the invention in which a clock signal is applied to delay elements and the data input is clocked with different delayed clock signals.

A block diagram of an embodiment of the present invention is illustrated in FIG. 1. The figure illustrates a segmented output driver with transition control. The driver accepts data on line 101 and an input clock on line 102. The input clock is delayed by four delay elements 121–124 with delays $t_{d1}$ to $t_{d4}$ to generate sequencing clocks c1 to c4 on lines 103–106. These sequencing clocks are used to clock the input data into four flip-flops 125–128. The outputs of the flip-flops, d1–d4 on lines 107–110, are input to current drivers 129–132. The current drivers sum their currents onto output line 111 so that the current waveform on this line is the superposition of the currents from the four current drivers.

Figure 2:
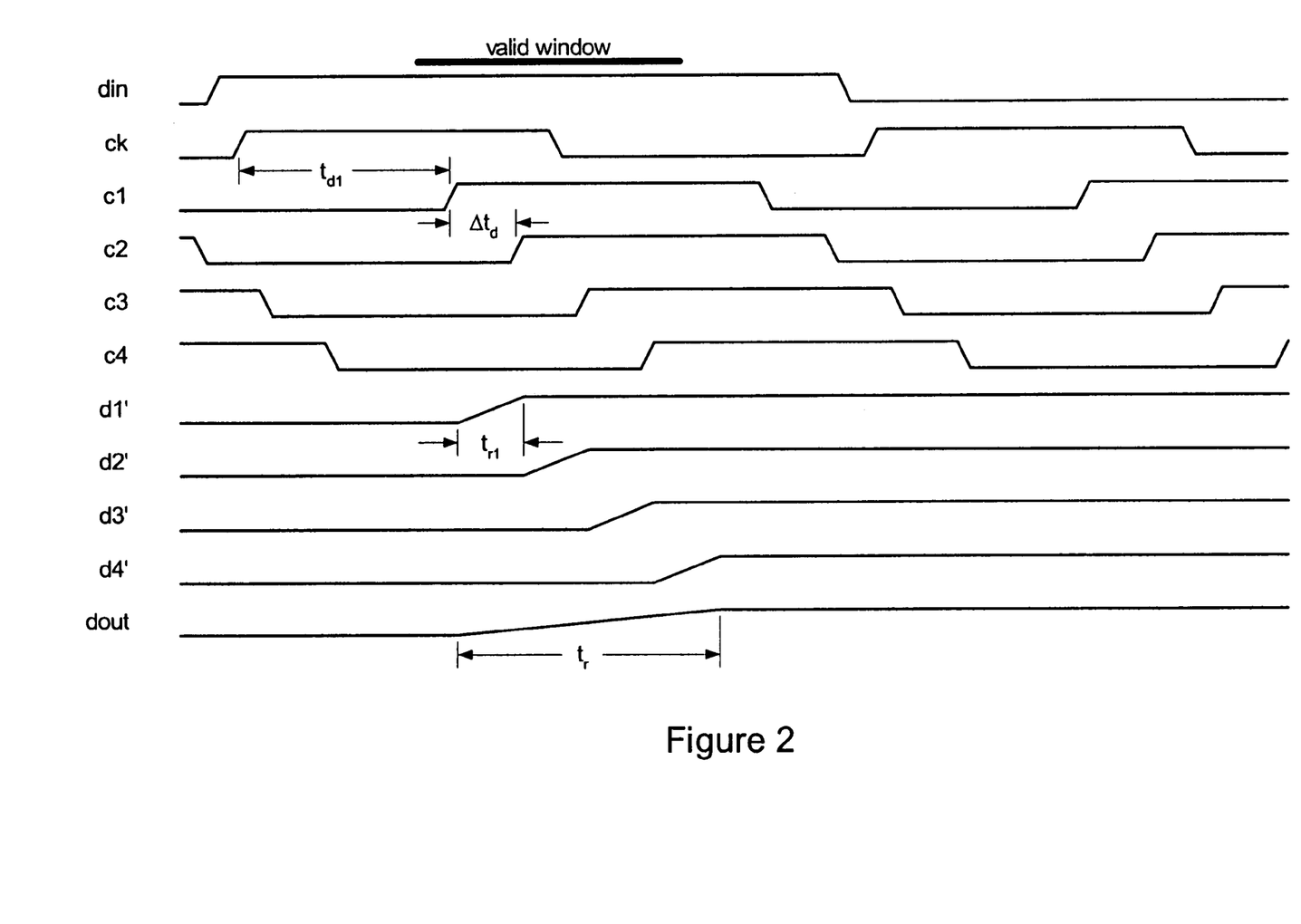
FIG. 2 is a timing chart for the circuit of FIG. 1.

The block diagram of FIG. 1 is best understood with reference to the waveforms of FIG. 2. The top trace shows the data input line 101 which rises at the beginning of the trace and remains high during the valid window when it is being sampled by sequencing clocks c1 to c4. One skilled in the art of digital design will understand that the data input signal is preconditioned using latches to guarantee that it is stable during this valid window. The second trace shows the input clock, ck on line 102. The next four traces show the sequencing clocks c1 to c4 on lines 103–106. The delay of each element is slightly different with delay element 121 having the smallest delay and delay element 124 having the largest delay. The delay increases by a fixed amount per element to give four evenly spaced sequencing clocks. The figure illustrates how these parallel delay elements can generate sequencing clocks with a spacing, $\Delta t_d$, that is much less than the delay of the fastest element, $t_{d1}$. The spacing is set by the difference between the delay of two elements, $\Delta t_d = t_{d2} - t_{d1}$. This is in contrast to prior art transition time control systems based on tapped delay lines where the spacing of sequencing clocks must be at least as large as the delay of an element, $t_d$.

The next four traces, traces 7 through 10, show the outputs d1'–d4' of the individual current drivers 129–132 before they are summed on the line. For clarity in the figure we have shown these signals with an unrealistically short delay from the clock inputs of the flip flops to the corresponding outputs of the current drivers (e.g., from c1 on line 103 to the output of current driver 129). In practice there would be a much larger delay between these two signals. However the causality of the signals is easier to appreciate with the waveforms as drawn in FIG. 2.

The rise time of an individual current driver, $t_{r1}$, is designed to be comparable to the spacing of the sequencing clocks, $\Delta t_d$, to ensure a smooth transition of the summed signal. The final output of the driver, the summed signal on data output line 111 is shown in the final trace. It has a rise time that is equal to $3\Delta t_d + t_{r1}$.

Figure 3:
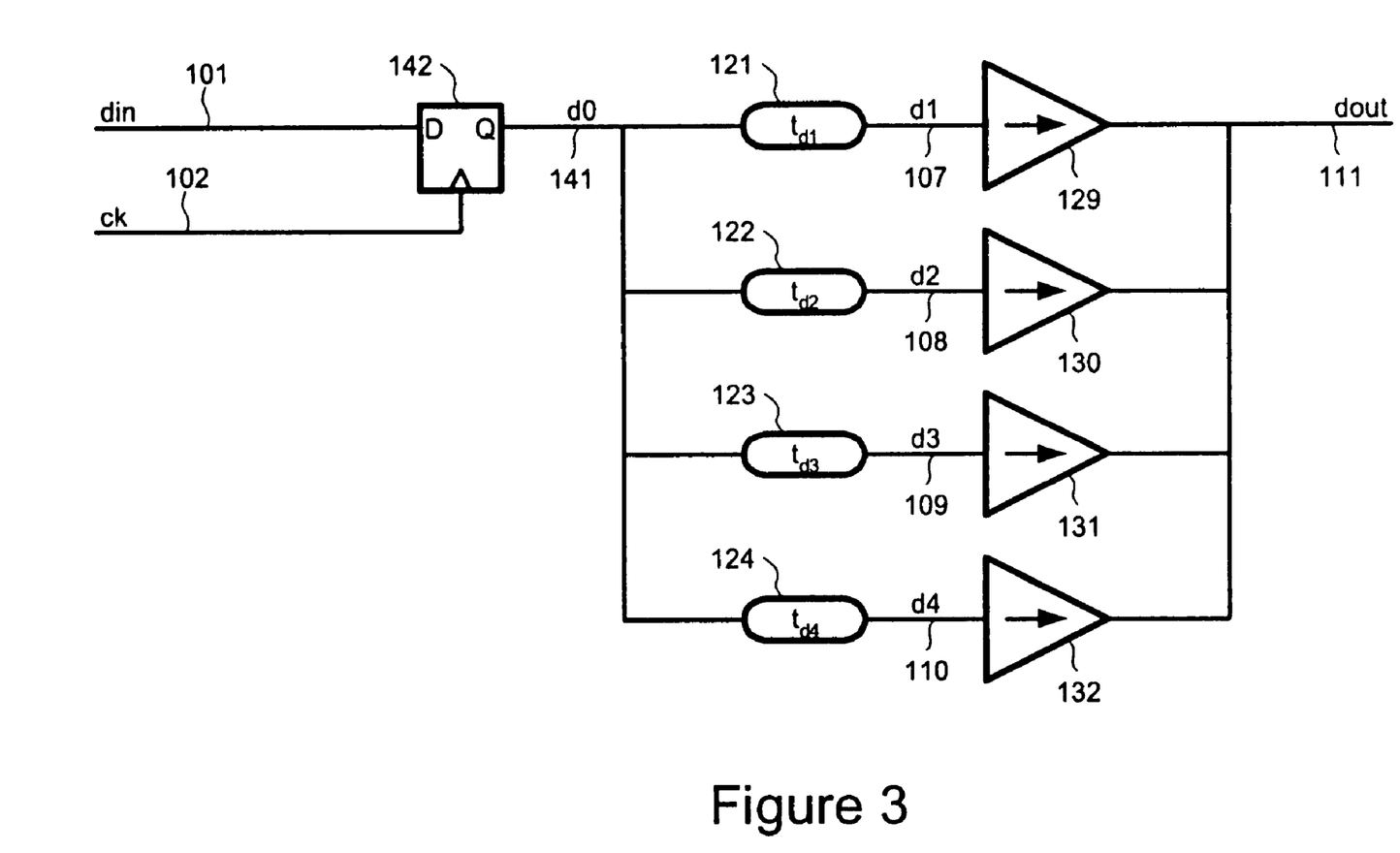
FIG. 3 illustrates an embodiment of the invention in which the input data is delayed directly in parallel delay elements.

FIG. 3 shows a block diagram for an alternate embodiment of the present invention in which the data, rather than the clock is delayed by a parallel arrangement of delay elements. In this embodiment the data in signal on line 101 is aligned with the clock, ck on line 102, by flip-flop 142. The aligned data signal, d0 on line 141, is then input to the four delay elements 121–124 with delays $t_{d1}$ to $t_{d4}$. In this case, the delay elements directly generate the skewed data signals d1 to d4 on lines 107 to 110. As with the system of FIG. 1, these data signals are then input to current drivers 129 to 132 which sum their outputs on data output line 111.

The embodiment of FIG. 3 is advantageous in that it requires fewer flip-flops than the embodiment of FIG. 1 and, thus, reduces clock loading. The embodiment of FIG. 1 is preferred, however, in cases where the sequencing clocks c1 through c4 can be shared across multiple output drivers.

Figure 4:
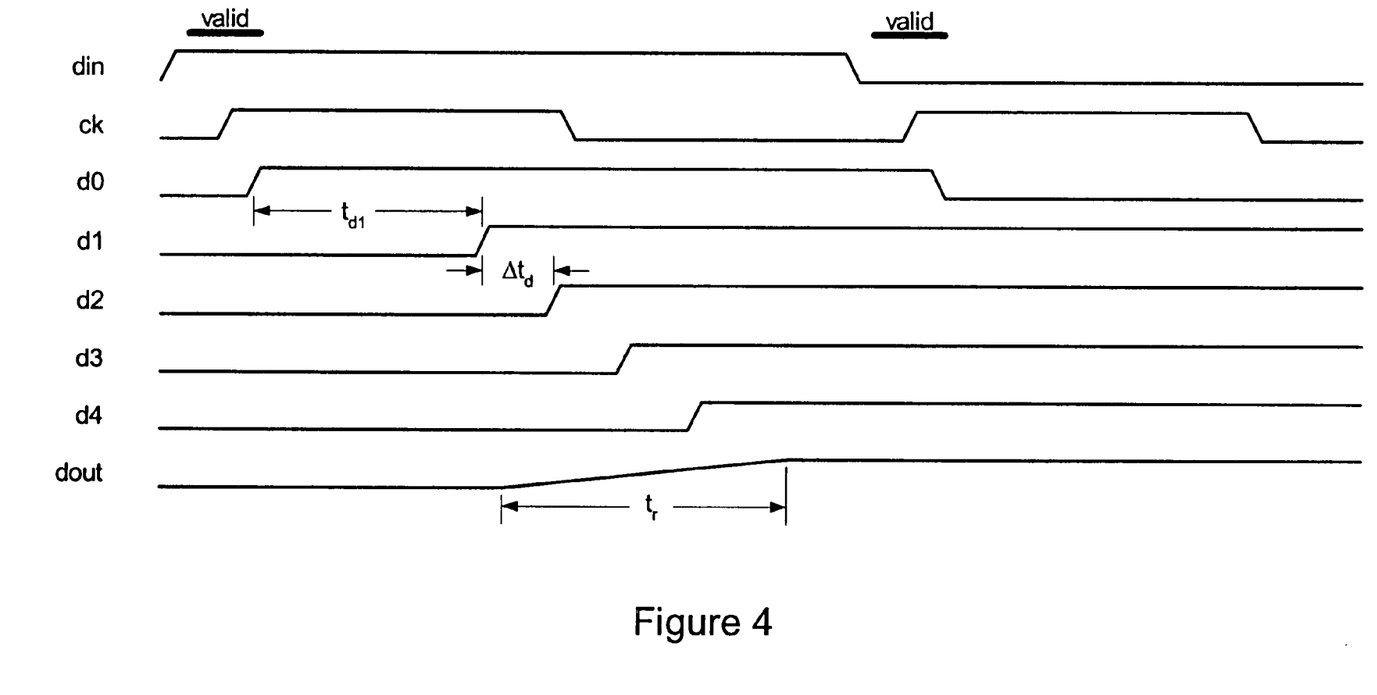
FIG. 4 is a timing chart for the circuit of FIG. 3.

The embodiment of FIG. 3 can be better understood by reference to the waveforms of FIG. 4. The first trace shows the data input, din on line 101, and the second trace shows the clock, ck on line 102. Because din is sampled by only a single clock, ck on line 102, it need only be valid during a small timing window, as illustrated, about the rising edge of the clock to account for setup and hold time. This is in contrast to the wide timing window required for din in the embodiment of FIGS. 1 and 2.

The third trace shows the aligned data out of flip-flop 142, d0 on line 141. This is a version of the data signal aligned to the clock. As in FIG. 3, we have purposely shown the clock-to-Q delay of the flip-flop much shorter than is realistic to improve the clarity of the figure. In reality there would be a much longer delay between the rising edge of clock and the transition on d0.

The next four traces show the outputs of the four delay elements, d1 to d4 on lines 107 to 110. In this figure we show the inputs to the current sources while in FIG. 2 traces with the same labels showed the outputs of the current sources with slower rise times. These traces illustrate how the parallel combination of delay lines is able to sequence signals with time differences, $\Delta t_d$, that are substantially smaller than the minimum delay of a delay element, $t_{d1}$.

The final trace of FIG. 4 shows the data output signal. This is the superposition of the outputs of current drivers 129 through 132. As with the embodiment of FIGS. 1 and 2, the rise time of this signal is equal to $3\Delta t_d + t_{r1}$.

One skilled in the art will understand that a high-speed driver with transition time control can be realized with many variations on the block diagrams of FIGS. 1 and 3. For example the driver may have a greater or smaller number of segments than the four segments shown in FIG. 1. The output drivers may be voltage mode rather than current mode. Also, the drivers may be differential rather than single ended. The flip flops of FIG. 1 may be replaced by latches, multiplexers, or a combination of latches, flip-flops, and multiplexers that aligns the data with the sequencing clocks. Finally, the sequencing clocks may be generated with a combination of series and parallel delay elements or with such elements in combination with a multi-phase clock or a clock generated by an array oscillator.

Figure 8:
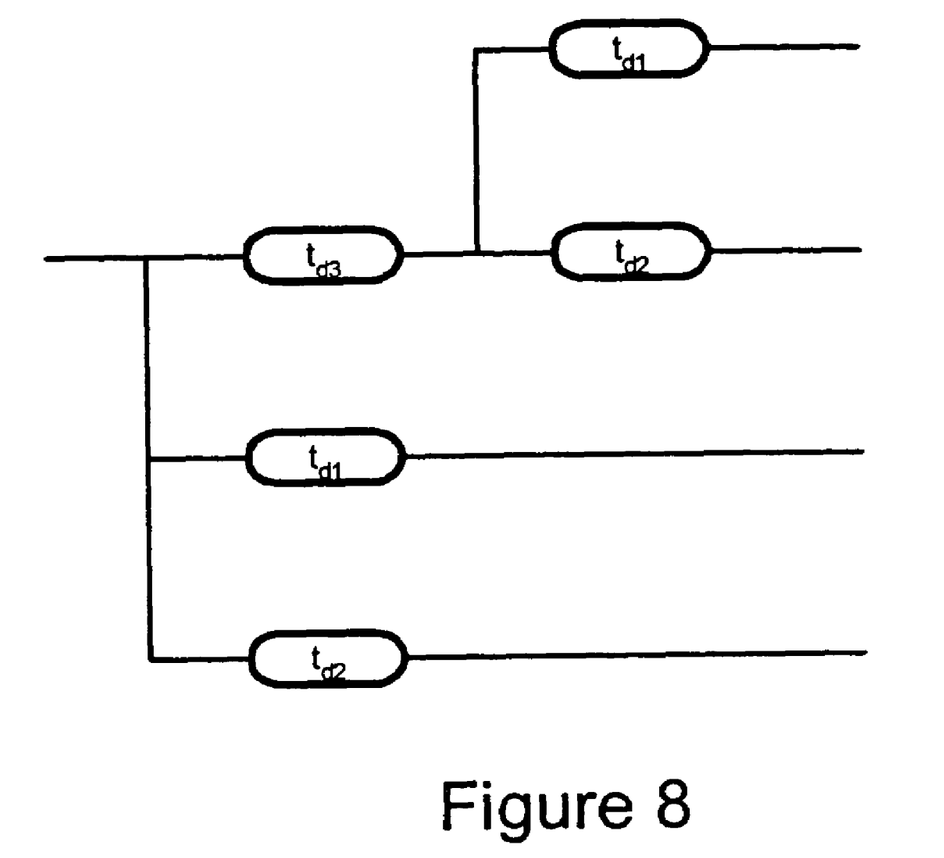
FIG. 8 illustrates an array of delay elements including serial/parallel connections of delay elements.

FIG. 8 illustrates an alternative array of delay elements in which parallel delays are obtained through serial/parallel connections of delay elements. In particular, of four delays, two are provided by connecting the parallel delays $t_{d1}$ and $t_{d2}$ in series with a common delay element $t_{d3}$.

Figure 5:
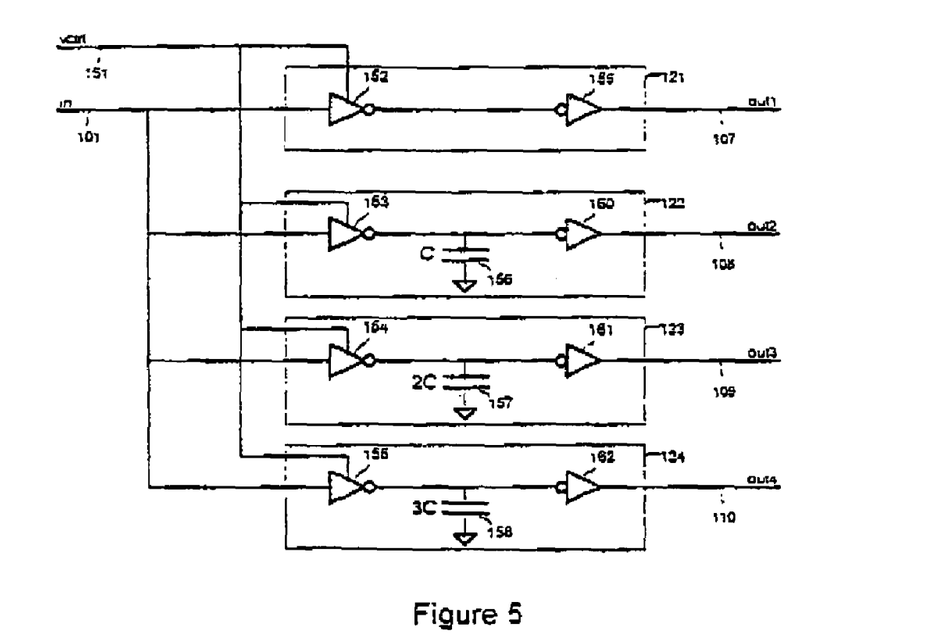
FIG. 5 illustrates and array of delay elements for use in either FIG. 1 or FIG. 3.

One embodiment of the array of delay elements 121–124 of FIGS. 1 and 3 is illustrated in FIG. 5. Each delay element comprises a pair of inverters. Other than the first element, each element also includes a capacitor to increase the delay of the element. For example, delay element 122 comprises inverters 153 and 160, and the output of inverter 153 is loaded by capacitor 156 with a capacitance of C. Subsequent delay elements use proportionally larger capacitors. Delay element 123 has a capacitor 157 with value 2C, and element 124 has capacitor 158 with value 3C.

The delay of a CMOS inverter increases in proportion to its output capacitance according to the formula, $t_d = t_{d0} + Ct_c$. In this formula $t_{d0}$ is the delay of an inverter with no output load and $t_c$ is the increase in inverter delay per unit of output load capacitance. Thus, the delay of element 121 in FIG. 5 is $t_{d1} = t_{d0} + C_p t_c$ where $C_p$ is the parasitic element of the intermediate node of the delay element. The delay of element 122 is $t_{d2} = t_{d0} + (C_p + C)t_c = t_{d1} + Ct_c$. Delay element 123 has delay $t_{d3} = t_{d0} + (C_p + 2C)t_c = t_{d2} + Ct_c$, and delay element 124 has delay $t_{d4} = t_{d0} + (C_p + 3C)t_c = t_{d3} + Ct_c$. Because the capacitance is increased by a fixed amount, C, at each stage, the delay also increases by a fixed amount, $\Delta t_d = Ct_c$ at each stage. The capacitance, C, is chosen so the increment in delay, $\Delta t_d = Ct_c$, is the required fraction of the bit time.

To compensate for the variation in delay due to process, voltage, and temperature variation the delay of inverters 152–155 can be varied by varying the supply voltage of each inverter. The supply voltage of these inverters is separated from the main supply and tied to control voltage, vctrl on line 151, to facilitate this compensation. As will be explained below, this control voltage can also be used to make the variation in delay between elements, and hence the transition time of the output, proportional to the bit time.

One skilled in the art will understand that the delay elements 121–124 can be implemented in many ways. Element delay can be varied by varying the drive of each inverter rather than varying the capacitive load. Delay can also be varied by varying the current to each stage. A differential delay element can be used rather than a single-ended element. A different circuit topology, for example a source-coupled FET delay stage can be used in place of a CMOS inverter.

Figure 6:
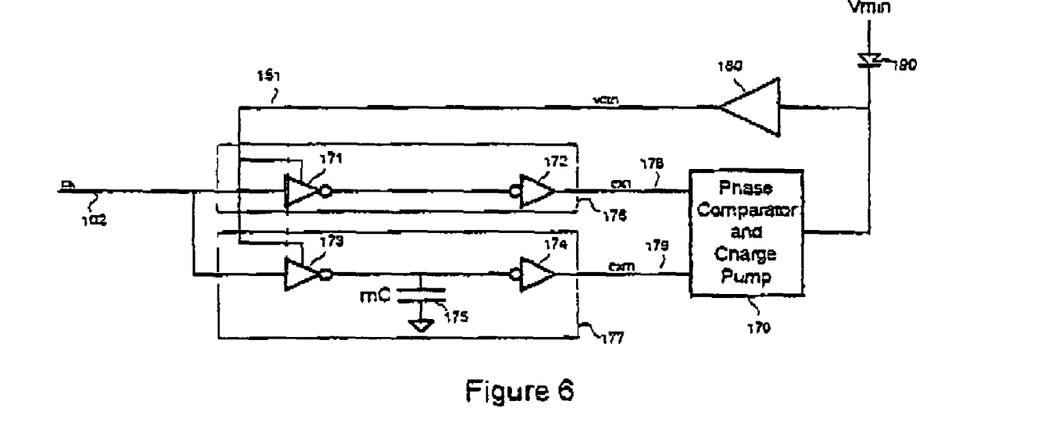
FIG. 6 illustrates a circuit to control the supply voltage to the delay element of FIG. 5.

A circuit that both compensates the delay elements of FIG. 5 for process, voltage, and temperature variations and at the same time adjusts the transition time to be proportional to bit time is illustrated in FIG. 6. The circuit comprises two delay elements, 176 and 177, of the same type used in FIG. 5, a phase comparator and charge pump, 170, and a voltage follower, 180. Delay element 176 has no additional capacitance while delay element 177 is loaded with a capacitor with capacitance mC. The phase comparator and charge pump may be of any type. The preferred embodiment uses a combined phase comparator and charge pump as disclosed in pending patent U.S. patent application Ser. No. 09/414, 761, filed Oct. 7, 1999, by Dally et al. for Combined Phase Comparator and Charge Pump Circuit.

This circuit uses feedback to adjust the control voltage, vctrl on line 151, so that the difference in delay between delay element 176 and delay element 177 is exactly one cycle of clock ck, i.e., one bit clock cycle, $t_{bit}$. If the difference between the delay of the elements is less than $t_{bit}$, the rising edge of the delayed clock signal cxm on line 179 will lead the rising edge (of the subsequent clock cycle) of the delayed clock signal cx1 on line 178 and the charge pump will decrease the control voltage. Decreasing the control voltage increases both the overall delay of both delay elements and the difference in delay between the elements. Eventually, this feedback will bring the two clock edges into alignment at the point where the difference in delay is exactly equal to $t_{bit}$. Similarly, if the delay difference is greater than $t_{bit}$, signal cx1 will lead signal cxm and the charge pump will increase vctrl to reduce the delay and again bring the two signals into alignment.

When the control loop has converged, the transition time of the driver is set to $(4/m)t_{bit}$. Because delay element 176 has delay $t_{dc1} = t_{d0} + C_p t_c$ and delay element 177 has delay $t_{dcm} = t_{d0} + (C_p + mC)t_c$, the difference in delay between the two elements is $\Delta t_{dc} = mCt_c$. When the loop has converged, this difference is equal to the bit time: $\Delta t_{dc} = t_{bit}$. Thus $t_{bit} = mCt_c$ and we have $\Delta t_d = Ct_c = t_{bit}/m$. Since the drivers of FIGS. 1 and 3 have a rise time of $t_r = 3\Delta t_d + t_{r1}$ or if $t_{r1} \sim \Delta t_d$, $t_r \sim 4\Delta t_d = (4/m)t_{bit}$. In the case where m=10, for example, the transition time is controlled to be 40% of the rise time.

To prevent the transition time from exceeding a maximum value when the bit clock, ck, is run very slowly, a diode clamp 190 is placed on the output of the charge pump that prevents vctrl from being decreased below a minimum value. This limits the rise time to be no greater than the delay corresponding to this clamped value. The diode clamp may be implemented with a diode-connected MOSFET.

Figure 7:
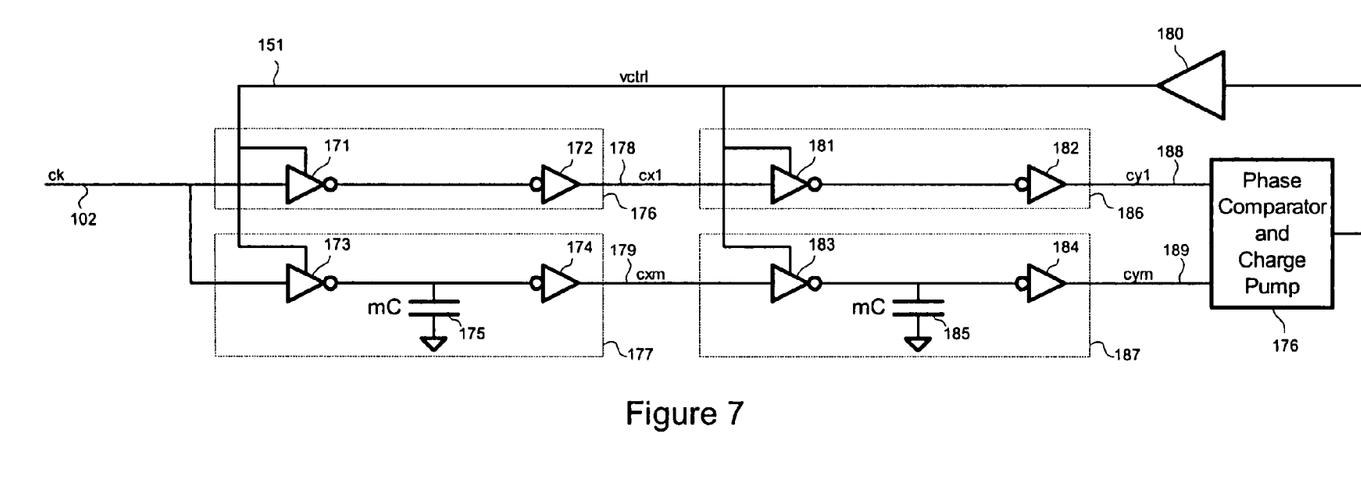
FIG. 7 illustrates a modification of the circuit of FIG. 6 for operation with a slow multiplexing clock.

In a multiplexing transmitter, the fastest available clock signal has a period that is $t_{ck} = nt_{bit}$ where n is the multiplexing factor, typically between 2 and 20. The compensation circuit of FIG. 6 can be modified to operate with such a slow multiplexing clock by placing multiple delay elements in series as illustrated in FIG. 7 for the case where n=2. In this circuit, the upper path of identical delay elements 176 and 186 has a delay that is twice the delay of element 176. Similarly, the lower path of identical delay elements 177 and 187 has a delay that is twice the delay of element 177. Thus when the feedback brings nodes cy1 on line 188 and cym on line 189 into phase we have $2\Delta t_{dc} = t_{ck} = nt_{bit}$ or for the case where n=2, $\Delta t_{dc} = t_{bit}$ as desired. One skilled in the art will understand that a clock at n times the bit rate can be accommodated by placing n copies of delay element 176 in series on the upper clock path and n copies of delay element 177 in series on the lower clock path.

While this invention has been particularly shown and described with references to preferred embodiments thereof, it will be understood by those skilled in the art that various changes in form and details may be made therein without departing from the scope of the invention encompassed by the appended claims.

What is claimed is:

1. A data transmitter comprising:
a data input to receive a data signal;
plural delay elements that apply different delays to the data input to provide plural delayed data signals; and
a data output that combines the delayed data signals to generate a data output signal, a rise or fall transition time of the data output signal being determined by different delays applied to the data input, wherein the rise or fall transition time of the data output signal is greater than the rise or fall transition time of the data signal.

2. A data transmitter as claimed in claim 1 wherein the delay elements are parallel delay elements connected in series with a common delay element.

3. A data transmitter as claimed in claim 1 wherein a clock signal is applied to the delay elements and different delays are applied to the data input by clocking the data input with different delayed clock signals.

4. A data transmitter as claimed in claim 3 wherein the delayed clock signals sequence output from the data input into plural driver circuits.

5. A data transmitter as claimed in claim 4 wherein each delay element comprises CMOS inverters.

6. A data transmitter as claimed in claim 5 wherein delay of a respective delay element is dependent on its output load capacitance.

7. A data transmitter as claimed in claim 1 wherein the data input is applied in parallel to the delay elements.

8. A data transmitter as claimed in claim 7 wherein an output the delayed data signals are applied to plural driver circuits.

9. A data transmitter as claimed in claim 8 wherein each delay element comprises CMOS inverters.

10. A data transmitter as claimed in claim 9 wherein delay of a respective delay element is dependent on its output load capacitance.

11. A data transmitter as claimed in claim 1 wherein the transition time of the data output is proportional to bit time associated with a bit clock.

12. A data transmitter as claimed in claim 1 wherein supply voltage to the delay elements is controlled to control delay of the delay elements.

13. A data transmitter as claimed in claim 12 further comprising a circuit to control the supply voltage to the delay elements, the circuit comprising:
first and second delay elements, each receiving a common clock signal; and
a phase comparator which compares outputs of the first and second delay elements and controls a supply voltage applied to the first and second delay elements to control phase difference of the outputs.

14. A data transmitter as claimed in claim 13 wherein each of the first and second delay elements comprises a sequence of n elements and the clock signal frequency is 1/n times a bit rate.

15. A data transmitter as claimed in claim 12 wherein the supply voltage is varied to compensate for environmental changes in delay.

16. A data transmitter as claimed in claim 1 further comprising a circuit to control supply voltage to the delay elements, the circuit comprising:
first and second delay elements, each receiving a common clock signal; and
a phase comparator which compares outputs of the first and second delay elements and controls the supply voltage applied to the first and second delay elements to control phase difference of the outputs.

17. A data transmitter as claimed in claim 16 wherein each of the first and second delay elements comprises a sequence of n elements and the clock signal frequency is 1/n times bit rate.

18. A data transmitter as claimed in claim 1, wherein the data input includes plural sampling elements, and wherein the plural delay elements apply different delays to the data input by applying different delays to an input clock to generate sequencing clock signals that are applied to respective ones of the plural sampling elements.

19. A data transmitter as claimed in claim 18 wherein each sampling element samples the data signal according to a respective one of the sequencing clocks.

20. A data transmitter as claimed in claim 19 wherein each sampling element includes one of the group consisting of latches, flip-flops, and multiplexers.

21. A data transmitter as claimed in claim 18 wherein the sequencing clocks have a spacing that is much less than delay of one of the delay elements.

22. A data transmitter as claimed in claim 21 wherein the spacing is dependent on a difference between delays of two of the delay elements.

23. A data transmitter as claimed in claim 1 wherein the data input includes a sampling element, and wherein the plural delay elements apply different delays to the data input by applying different delays to an output of the sampling element.

24. A data transmitter as claimed in claim 23, wherein the sampling element includes one of the group consisting of latches, flip-flops, and multiplexers.

25. A data transmitter as claimed in claim 1 wherein the plural delay elements include a parallel arrangement of delay elements that apply different delays to a data signal sampled by the data input to provide the plural delayed data signals.

26. A data transmitter as claimed in claim 6, wherein the output load capacitance of a respective delay element is chosen so that an increment in delay corresponds to a required fraction of a bit time associated with a bit clock.

27. A data transmitter as claimed in claim 10, wherein the output load capacitance of a respective delay element is chosen so that an increment in delay corresponds to a required fraction of a bit time associated with a bit clock.

28. A method of transmitting data comprising:
applying different delays to a data input receiving a data signal to provide plural delayed data signals; and
combining the plural delayed data signals to provide a data output signal having a rise or fall transition time determined by different delays applied to the data input, wherein the rise or fall transition time of the data output signal is greater than the rise or fall transition time of the data input signal.

29. A method as claimed in claim 28 wherein the different delays are obtained by applying a first delay to the data input and further delaying in parallel delay elements.

30. A method as claimed in claim 28 wherein a clock signal is applied to the delay element to generate different delayed clock signals and different delays are applied to the data input by clocking the data input with the different delayed clock signals.

31. A method as claimed in claim 30 wherein the delayed clock signals sequence output from the data input into plural driver circuits.

32. A method as claimed in claim 31 wherein each delay is obtained in CMOS inverters.

33. A method as claimed in claim 32 wherein delay of a respective delay element is dependent on its output load capacitance.

34. A method as claimed in claim 29 wherein an output from the data input is applied in parallel to the delay elements.

35. A method as claimed in claim 34 wherein the delay data signals are applied to plural driver circuits.

36. A method as claimed in claim 35 wherein each delay element comprises CMOS inverters.

37. A method as claimed in claim 36 wherein delay of a respective delay element is dependant on its output load capacitance.

38. A method as claimed in claim 28 wherein the transition time of the data output is proportional to bit time.

39. A method as claimed in claim 29 further comprising controlling supply voltage to the delay elements to control delay of the delay elements.

40. A method as claimed in claim 39 wherein the supply voltage to the delay elements is controlled by:
applying a common clock signal to first and second delay elements; and
comparing outputs of the first and second delay elements and controlling the supply voltage applied to the first and second delay elements to control phase difference of the output.

41. A method as claimed in claim 40 wherein each of the first and second delay elements comprises a sequence of n elements and the clock signal is 1/n bit rate.

42. A method as claimed in claim 39 wherein the supply voltage is varied to compensate for environmental changes in delay.

43. A method as claimed in claim 29 wherein supply voltage to the delay elements is controlled by:
applying a common clock signal to first and second delay elements; and
comparing outputs of the first and second delay elements and controlling the supply voltage applied to the first and second delay elements to control phase difference of the outputs.

44. A method as claimed in claim 43 wherein each of the first and second delay elements comprises a sequence of n elements and the clock signal frequency is 1/n times bit rate.

45. A method as claimed in claim 28, wherein the data input includes plural sampling elements and the step of applying includes applying different delays to an input clock to generate sequencing clock signals that are applied to respective ones of the plural sampling elements.

46. A method as claimed in claim 45 wherein each sampling element samples the data signal according to a respective one of the sequencing clocks.

47. A method as claimed in claim 46 wherein each sampling element includes one of the group consisting of latches, flip-flops, and multiplexes.

48. A method as claimed in claim 45 wherein the sequencing clocks have a spacing that is much less than delay of one of the delay elements.

49. A method as claimed in claim 48 wherein the spacing is dependent on a difference between delays of two of the delay elements.

50. A method as claimed in claim 28 wherein the data input includes a sampling element, and wherein the step of applying includes applying different delays to an output of the sampling element.

51. A method as claimed in claim 50, wherein the sampling element includes one of the group consisting of latches, flip-flops, and multiplexers.

52. A method as claimed in claim 28 wherein the step of applying includes applying different delays to a data signal sampled by the data input to provide the plural delayed data signals.

53. A method as claimed in claim 33 wherein the output load capacitance of a respective delay element is chosen so that an increment in delay corresponds to a required fraction of a bit time associated with a bit clock.

54. A method as claimed in claim 37 wherein the output load capacitance of a respective delay element is chosen so that an increment in delay corresponds to a required fraction of a bit time associated with a bit clock.

55. A data transmitter comprising:
a data input to receive a data signal;
plural delay means for applying different delays to the data input to provide plural delayed data signals; and
data output means for combining the delayed data signals into a data output signal having a rise or fall transition time determined by different delays applied to the data input, wherein the rise or fall transition time of the data output signal is greater than the rise or fall transition time of the data signal.

* * * * *

UNITED STATES PATENT AND TRADEMARK OFFICE
CERTIFICATE OF CORRECTION

PATENT NO. : 7,187,721 B1 Page 1 of 1
APPLICATION NO. : 09/557164
DATED : March 6, 2007
INVENTOR(S) : William J. Dally and John W. Poulton It is certified that error appears in the above-identified patent and that said Letters Patent is hereby corrected as shown below:

<u>Column 7</u>

Line 41 through line 42, delete "an output".

Line 66, delete "a".

<u>Column 8</u>

Line 64, delete "input".

Signed and Sealed this

Twenty-ninth Day of April, 2008

JON W. DUDAS
*Director of the United States Patent and Trademark Office*